(12) United States Patent
Swanson et al.

(10) Patent No.: US 7,493,564 B2
(45) Date of Patent: Feb. 17, 2009

(54) METHOD FOR THE DISPLAY OF VISUAL SEQUENCING OF LAUNCHED APPLICATION PORTLETS AND TASK PAGE RELATIONSHIP INFORMATION IN A WEB-BASE ENVIRONMENT

(75) Inventors: Carl Steven Swanson, Austin, TX (US); Gary Thomas Barta, Round Rock, TX (US); Eric John Fingal, Manor, TX (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 11/114,534

(22) Filed: Apr. 26, 2005

(65) Prior Publication Data

US 2006/0242582 A1 Oct. 26, 2006

(51) Int. Cl.
*G06F 3/00* (2006.01)

(52) U.S. Cl. .................. 715/738; 715/742; 715/744

(58) Field of Classification Search ......... 715/734–747, 715/200, 201; 709/200, 201, 225, 218; 717/110; 719/328
See application file for complete search history.

(56) References Cited

U.S. PATENT DOCUMENTS

| | | | |
|---|---|---|---|
| 6,724,409 B1 | 4/2004 | Maddocks et al. | 715/853 |
| 6,801,949 B1 | 10/2004 | Bruck et al. | 709/232 |
| 2003/0117437 A1 | 6/2003 | Cook et al. | 715/764 |
| 2004/0090969 A1 * | 5/2004 | Jerrard-Dunne et al. | 370/395.54 |
| 2004/0189693 A1 | 9/2004 | Kening | 715/736 |
| 2004/0201627 A1 | 10/2004 | Maddocks et al. | 715/762 |
| 2004/0230947 A1 * | 11/2004 | Bales et al. | 717/110 |
| 2005/0192771 A1 * | 9/2005 | Fischer et al. | 702/122 |
| 2005/0256940 A1 * | 11/2005 | Henderson et al. | 709/219 |
| 2005/0257154 A1 * | 11/2005 | Bales et al. | 715/734 |
| 2006/0026557 A1 * | 2/2006 | Petri | 717/106 |
| 2006/0031377 A1 * | 2/2006 | Ng et al. | 709/208 |
| 2006/0053376 A1 * | 3/2006 | Ng et al. | 715/742 |
| 2006/0080612 A1 * | 4/2006 | Hayes et al. | 715/742 |
| 2006/0085500 A1 * | 4/2006 | Allamaraju et al. | 709/203 |
| 2006/0089990 A1 * | 4/2006 | Ng et al. | 709/227 |
| 2006/0184882 A1 * | 8/2006 | Molander et al. | 715/733 |

FOREIGN PATENT DOCUMENTS

WO   WO 2004/088511   10/2004

* cited by examiner

*Primary Examiner*—Tadeese Hailu
(74) *Attorney, Agent, or Firm*—Jeffrey LaBaw; Darcell Walker

(57) ABSTRACT

A display portlet is incorporated into a portal page in a web-based environment. This display portlet presents the launch sequence of the portlets that are currently running on that portal page. The displayed launch sequence indicates the source of a launched portlet and displays any portlets that are launched by a portlet running on that portal page. The visual representations can be of various formats such as a spacial display or a tree representation. Each launched portlet has a stored record containing information about the portlet, the portlet that launched it and any portlets launched by the particular portlet.

15 Claims, 9 Drawing Sheets

METHOD FOR THE DISPLAY OF VISUAL SEQUENCING OF LAUNCHED APPLICATION PORTLETS AND TASK PAGE RELATIONSHIP INFORMATION IN A WEB-BASE ENVIRONMENT

FIELD OF THE INVENTION

The invention relates to the display of portlets launched in a web portal page and in particular to a method and system for tracking and displaying sequences of launched application portlets and the relationship between launched portlets and the launching portlets.

BACKGROUND OF THE INVENTION

As the use of the Internet becomes more pervasive, better technology is constantly being developed for displaying web content. Web portal pages have become an increasingly popular means of delivering aggregated, personalized content to computer users. A portal is a point of access to data and applications that provides a unified and personalized view of information and resources. Portals are typically implemented as websites on the World Wide Web and are accessible via web browser applications. Portals have evolved from simple one page content sites to multi-page aggregations of content and applications with integration to back-office systems.

Typically, a portal page is rendered and delivered to a viewing user from a portal server. The portal server includes a portal program such as WebSphere Portal Server, which is commercially available from International Business Machines Corp. of Armonk, N.Y. is loaded on the portal server. The portal program generally obtains and aggregates web content into a portal page. As known in the art, a portal page includes sections or portlets that each contain particular web content formatted according to a user's preferences. For example, a user could establish his/her own portal page that has sections for news, weather, sports, etc. When the portal page is requested, the portal program would obtain the desired web content from the appropriate content providers. Once obtained, the portal content would be aggregated, and then displayed as a portal web page. This portal technology has lead to the explosion of personalized "home" pages for individual web users (e.g., MY.YAHOO.COM).

In particular, the emerging web desktop can provide users with access to what is commonly referred to as a portal. The portal can allow a user to access multiple applications through a single screen (displayed by the web browser). For example, some portals allow users to access applications that can show disparate data, such as weather, sports, stock information, or the like, to a user on a single screen. Much of the processing needed to manage the portal (such as administration, customization, and switching) can place even greater demands on the bandwidth available between the browser and the application.

Traditionally, portals can be accessed through desktop browser applications. Browsers have been referred to as "rich clients" as browsers can provide powerful rendering capabilities, including the ability to apply style sheets to content to ensure conformity in visual appearance between applications.

Portals represent a sensible solution to the problem of aggregating content through a channel paradigm in a single, network-addressable location. In consequence, portals have become the rage in content distribution.

As mentioned, portlets are the visible active components included as part of portal pages. Similar to the graphical windows paradigm of windowing operating systems, each portlet in a portal occupies a portion of the portal page through which the portlet can display associated content from a portlet channel. Portlets are known to include both simple applications such as an electronic mail client, and also more complex applications such as forecasting output from a customer relationship management system. The prototypical portlet can be implemented as server-side scripts executed through a portal server.

From the end-user perspective, a portlet is a content channel or application to which the end-user can subscribe. By comparison, from the perspective of the content provider, a portlet is a means through which content can be distributed in a personalized manner to a subscribing end-user. Finally, from the point of view of the portal, a portlet merely is a component, which can be rendered within the portal page. In any case, by providing one or more individually selectable and configurable portlets in a portal, portal providers can distribute content and applications through a unified interface in a personalized manner according to the preferences of the end-user.

Developers have begun to apply the portlet technology for commercial applications. For example, a portal page can be used to customize a page for an employee, customer, supplier, etc. In these applications, data presented in the portlets is often related. For example, data in a "destination city" field of a travel portlet could be shared with a "target city" field of a weather portlet. In current implementations, a portlet can share data with another known portlet by using messaging or passing parameters. However, the portlet developer must have detailed knowledge of all participating portlets in order to implement the data sharing. Further, the decision of whether to share data, and what data to share is fixed when a portlet is developed. These limitations restrict the reusability and interoperability of portlets.

Portal complexity has also increased due to the growth in the number of portal users. However, tools for administering portals have not kept pace with these trends. The problem addressed is in a web portal environment, with applications running with dynamic screen content and interaction. Unlike some portal applications that deliver content that changes infrequently, application interfaces in a portal deliver rapidly changing content. As an application delivers content, accepts user input, and then launches other portlets with that context and information, several different portlets tend to build up on the screen. This is as designed and what is intended, but when these portlets present the same basic information, but with a different context, it becomes difficult to follow the chain of user interactive launches from one portlet to another and from one task page to another. This becomes confusing to user and detracts from a carefully laid out and designed interface.

A method is needed then to organize these launched portlets and task pages on the screen and allow a user to quickly and easily determine what order and what sequence led to a portal screen layout.

SUMMARY OF THE INVENTION

It is an objective of the present invention to provide a method to display portlet and task page launch sequence in a Web-based Portal environment.

It is a second objective of the present invention to provide a record containing all portlets that have been launched from a specific portlet in a Web-based portal environment.

It is a third objective of the present invention to provide a portlet launch sequence display as a spacial display to a web user.

It is a fourth objective of the present invention to provide a portlet launch sequence display in a tree representation display to a web user.

It is a fifth objective of the present invention to provide a method capable of displaying a multiple page portlet launch sequence to a web user.

It is a sixth objective of the present invention to provide an updated visual display when a new portlet is launched or a running portlet terminates.

The main concept of the present invention is a method to display and visualize the portlet and task page launch sequences in a Web-based Portal environment. In a portal environment, some applications allow user to launch portlets from user actions. Those portlets then allow the user to launch other portlets, and so on. What then happens, the user may have many portlets on the screen, and no way to relate which portlets launched other portlets. Many times, this is important, so that the user can relate information in between those portlets, making decisions, etc.

In the method of the present invention, a launched and running portlet would be displayed to the web user. During the execution, if a portlet launched an additional portlet, this additional portlet will also be displayed along with and in relation to the launching portlet. In a spacial portlet display, an arrow or other marker can appear to indicate that a portlet was launched from another portlet on the web screen. The marker will display the relationship between portlets appearing in the web-based portal environment.

In an implementation of the method, a monitor detects the launching of a portlet. A record is created for that portlet. This record contains information which includes the name of the portlet, and which portlet, if any, launched the portlet. The record can contain pointer fields that point to a launching portlet and to any launched portlets. These records are stored such that a display routine can retrieve information from these records and display a visual presentation of the relationships of the launched portlets. The basic steps of the method of the invention include:

On initial launch, the launch sequence portlet contains the current portlets that were statically pre-defined on that page.

On every portlet launch, the launch sequence portlet intercepts a signal that contains the launching portlet information and the launched portlet information.

This information is then processed, and displayed in the launch sequence visualization portlet.

When a portlet is closed, that signal is intercepted, and the launched sequence visualization portlet is updated to remove that removed portlet The display can be a small portlet type ledger containing icons/windows for every currently launched portlet. Within this ledger would be markers indicating the launch sequence relationships between the launched portlets.

As a result, the method of this invention presents to the user a way to distinguish which portlets launch other portlets, and how that inter-relationship exists in the application.

DESCRIPTION OF THE INVENTION

Figure 1:
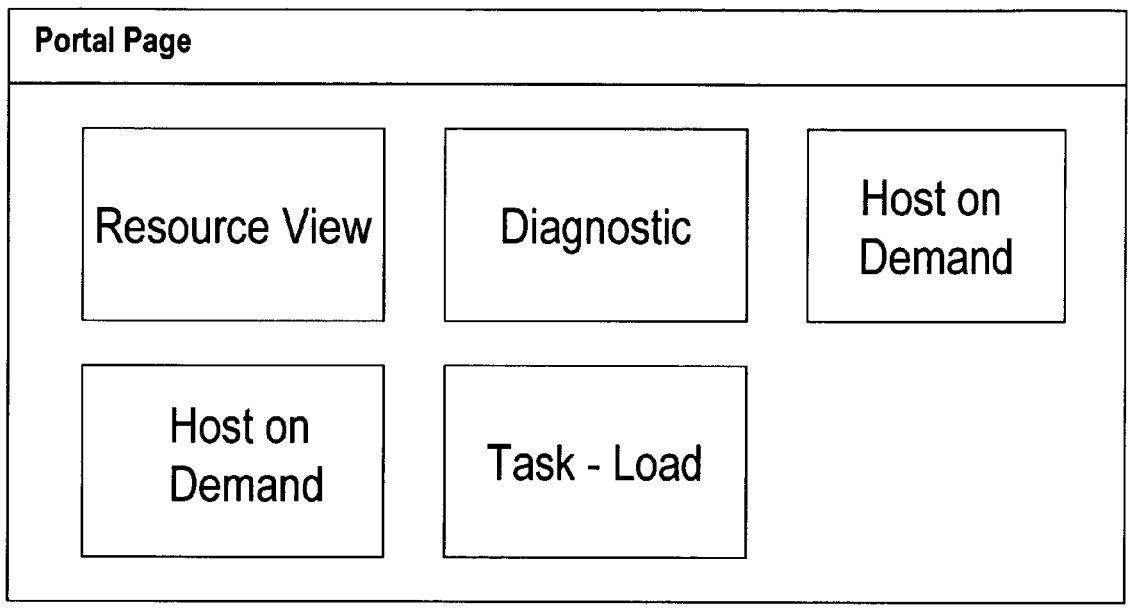
FIG. 1 is a conventional display of portlets on a portal page.
Figure 2:
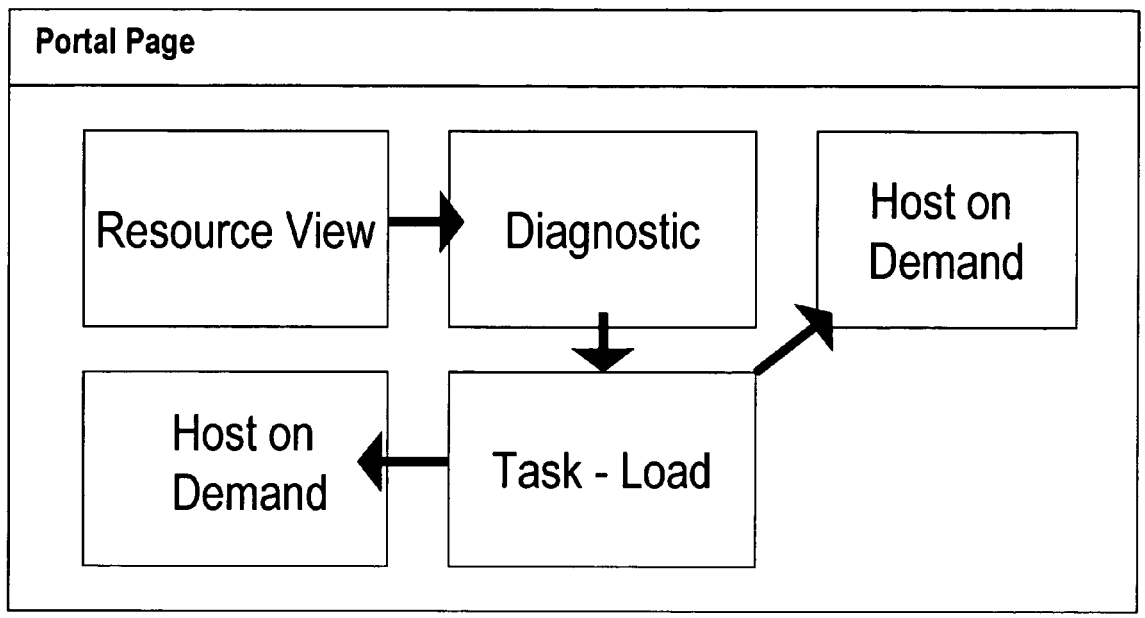
FIG. 2 is a conventional display of portlets on a portal page containing portlet launch information.

Referring to FIG. 1, shown is a display of portlets on a conventional portal web page. This portal page currently contains five portlets that perform functions related to the name of each portlet. However, conventional portal web pages contain the portlets as shown without any marker to indicate the relationship between portlets. The problem with this display is that the user may not know any information concerning the relationship of the portlets to each other. In FIG. 2, the arrows indicate a launch sequence between the portlets. In this launch sequence the 'Resource View' portlet has launched the 'Diagnostic' portlet; the 'Diagnostic' portlet has launched the 'Task Load' portlet; and the 'Task Load' portlet has launched both the 'Host on Demand' portlets.

Figure 3A:
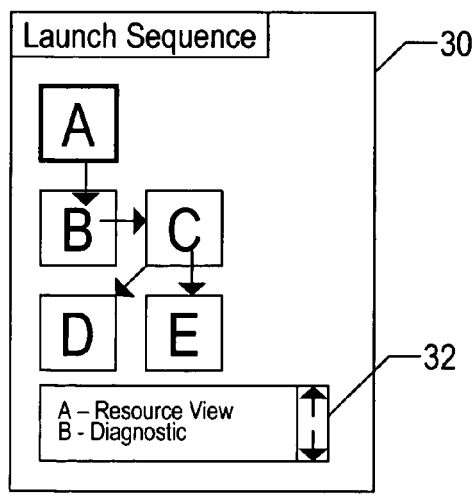
FIG. 3a is an illustration of a spacial launch sequence portlet for use in a portlet sequence display in accordance with the present invention.
Figure 3B:
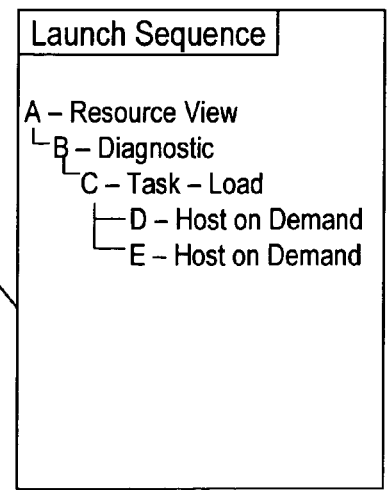
FIG. 3b is an illustration of a tree launch sequence portlet for use in a portlet sequence display in accordance with the present invention.

Another display representation of the relationship of the launched portlet could be an additional portlet on the display containing the portlet launch sequence information. FIGS. 3a and 3b illustrate this concept. With regard to FIGS. 3a and 3b, small launch sequence portlets 30 and 31, containing portlet launch information, could be incorporated into this display. The launch sequence visualization portlet has several views that can display the launched portlets sequences. Two of the modes described herein include the spacial view and the tree view.

FIG. 3a is an illustration of a spacial launch sequence portlet 30 for use in a portlet sequence display. This launch sequence portlet contains small icons of generic portlets with launch relationship details of what portlet launched what other portlets. This display process also includes an algorithm that maintains proper size and spacing so that all portlets can show all relationships in the rectangular portlet space. Hoverover function allows more info on that portlet to be displayed when the mouse hovers over it.

In this launch display portlet 30, five portlets are currently running. As shown, portlet 'A' launches portlet 'B'. Portlet 'B' launches portlet 'C'. Portlet 'C' launches portlets 'D' and 'E'. Additional launch sequences can also be displayed in the launch display portlet 30. In this portlet display, the letter designations for each portlet may be desirable and/or necessary because of the space that may be required if the actual names of the portlets was display. As a result, a ledger 32 can be included in the portlet display to identify the name/function of each portlet in the display.

The portlet launch sequence visualization portlet shows up in the portal browser screen. It has different display modes the user can change, is fairly small and unobtrusive, can be hidden or displayed as desired, and shows the layout of he rest of the portal task page.

FIG. 3b shows a tree representation of the launched portlets sequence. The tree representation shows a text that details what portlets launched what other portlets. This text display screen is an alternative to multiple icon approach of FIG. 3a.

For both views, as the number of portlets grows beyond the ability for a user to understand the data on a single portlet screen, a scroll mechanism will expand to allow the user to access the information extending down in that portlet. This always forces the launch visualization portlet to be a small and unobtrusive portlet.

Some portlets are placed statically on a page at page creation and installation time, while other portlets are launched on that page due to user actions. The differences between these two types of portlets are denoted as different colors or transparency.

The portlet has a basic layout that displays the portlet's that have been statically placed on a page, as well as those portlets launched to the page. These portlets can be represented as either a visual layout, or a tree layout.

For a spacial representation:
  Portlets that were statically placed in the page are denoted by a particular color or notation
  Portlets that were launched from those static portlets are denoted by a different color or notation
  The portlet launch relationship is specified using launch arrows
  The portlet naming abbreviations (A, B, C, etc) are used to conserve space, but hover text and the listbox at the bottom will show the mapping to the name of the portlet For a tree representation:
  Portlets that were statically placed on the page are denoted by a particular color or notation
  Portlets that were launched from those static portlets are denoted by a different color or notation
  The portlet launch relationship is specified using hierarchical tree notation, that can be manipulated, expanded, collapsed, etc.

Figure 4:
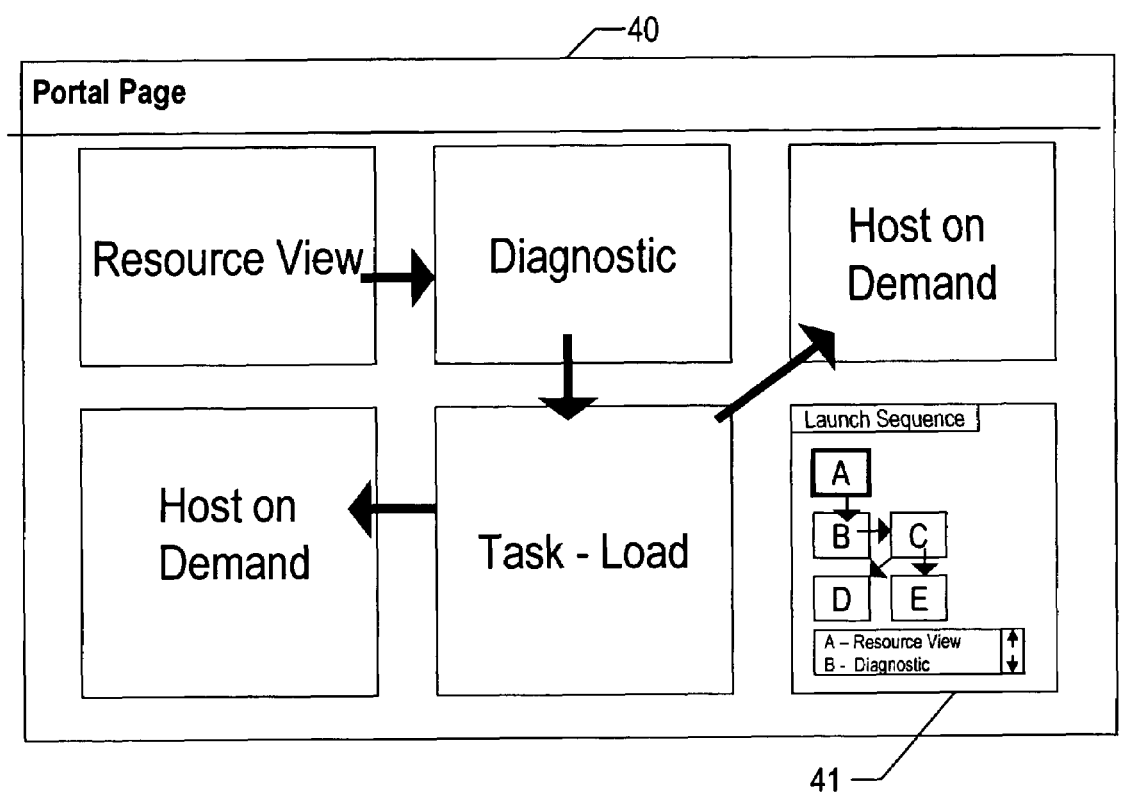
FIG. 4 is an illustration of a portlet sequence display screen using a spacial representation of the launched portlets.

FIG. 4 is an illustration of a portlet sequence display screen using a spacial representation of the launched portlets. As shown, the portal page 40 has five running portlets. A sixth portlet 41 displays the launch sequence of the five running portlets. Also shown in this display are arrows that indicate the launch sequence with the actual portlets. These arrows in the actual portal page are not needed with the inclusion of the launch sequence display portlet 41.

Figure 5:
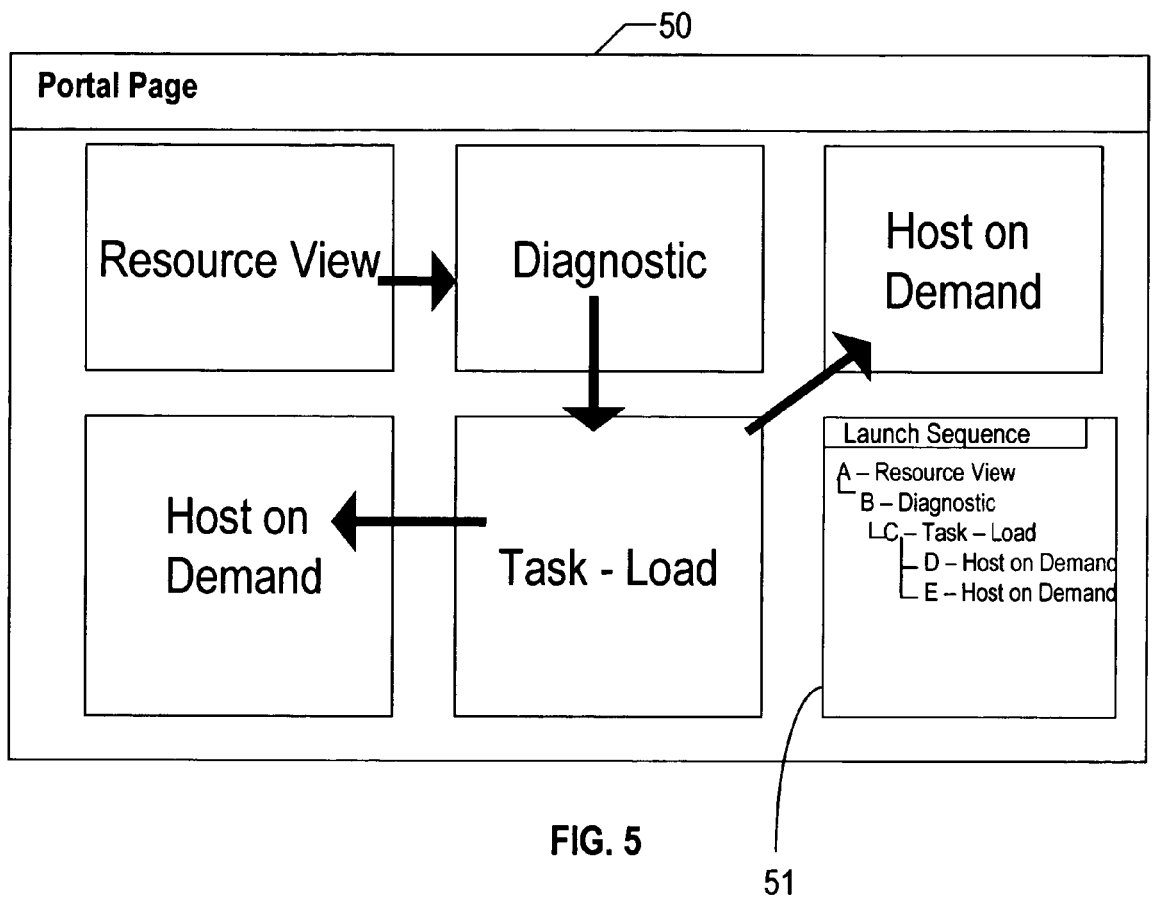
FIG. 5 is an illustration of a portlet sequence display screen using a tree representation of the launched portlets.

FIG. 5 is an illustration of a portlet sequence display screen using a tree representation of the launched portlets. As with FIG. 4, the portal page 50 has a sixth launch sequence portlet 51 that displays a tree representation of the launch sequence of the portlets. Again, the shown arrows are not needed with the inclusion of the launch sequence portlet display 51.

The present invention also provides a method to display the launching of portlet pages from other portal pages. Portlets can launch not only other portlets, but also whole pages. This can become extremely important when the page launched is a diagnostic-view or other sub-view from the launching page. If the two cannot be connected, the user can get fairly confused.

Figure 6:
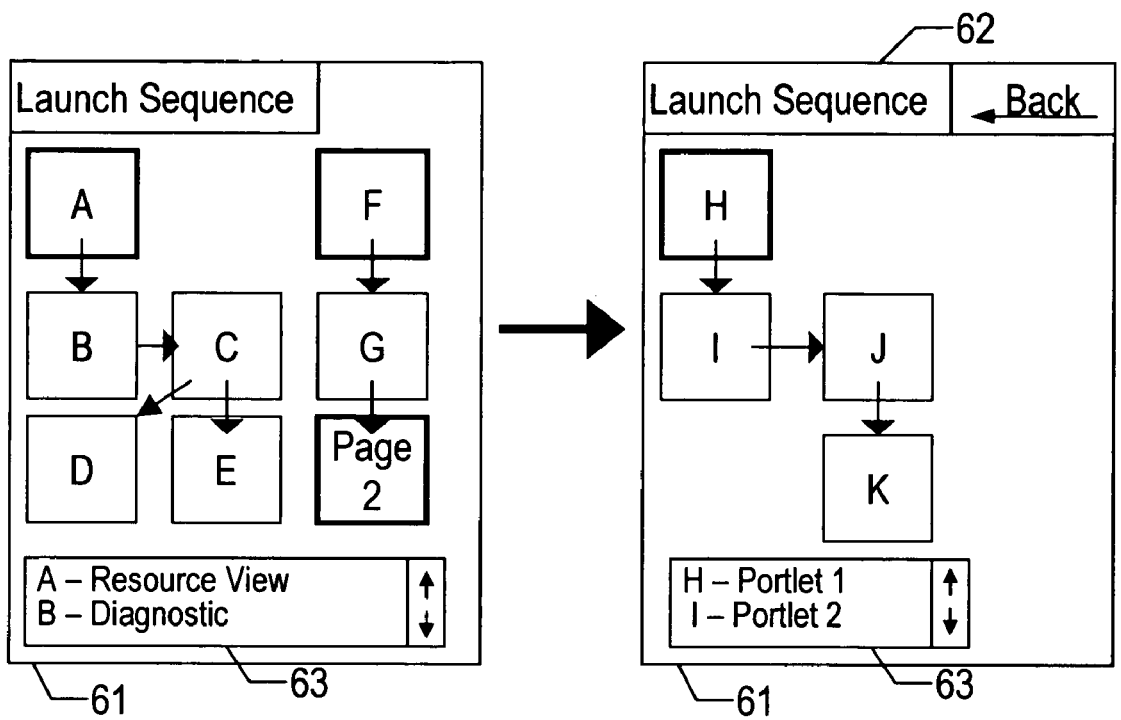
FIG. 6 is an illustration of a portlet sequence display with multiple pages.

FIG. 6 is an illustration of a portlet sequence display with multiple pages. Shown are pages 60 and 61. In a second launch sequence on page 1, portlet 'F' launches portlet 'G' which launches portlet 'H'. In this operation, the visualization portlet shows that Portlet 'G' on the Launching Page 60 has launched a portlet H on another task page 61, and then on that page another Launch Sequence Visualization Portlet 61 has appeared to display that page's launched portlets. The launched page's visualization portlet also has a way to re-reference the page that launched it, and a back button 62, that will switch the page back to the launching page 60. Each page 60 and 61 also contains a ledger 63 of the portlets that are running on the page.

Figure 7A:
FIG. 7a shows a record format for capturing information about launched portlets in accordance with the present invention.

As previously mentioned, a record is created for each launched portlet. FIG. 7a shows a record format for capturing information about launched portlets in accordance with the present invention. The information in the record will comprise information pointing to the launching portlet, if any, and any portlets that were launched. In addition, the record would contain the name of the portlet. This information can be arranged in the record in any arrangement desired by the system designer. In FIG. 7a, field 1 designates the pointer to the portlet that launched the present portlet. Field 2 contains the name of the present portlet. Field 3 contains information of pointing to portlets that were launched by the present portlet.

Figure 7B:
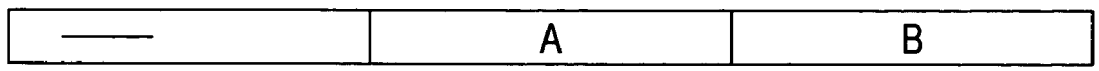
FIGS. 7b through 7f show sample records with information about the relationship of launched portlets on a web-based portal environment.
Figure 7C:
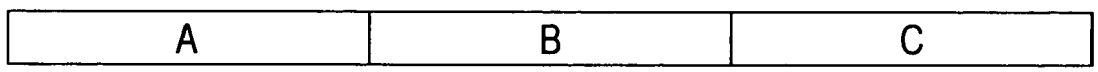
Figure 7D:
Figure 7E:
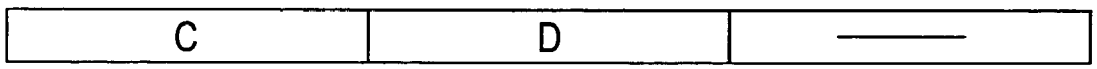
Figure 7F:

FIGS. 7b through 7f illustrate the storage of information in records in accordance with the launch sequence of FIG. 2. FIG. 7b represents the record the 'Resource View' portlet. This portlet was initially launched, so there is no launching portlet. The record 7b leaves field A blank to indicate initial launch status of the portlet. Field 2 list the name/identification of the portlet for that record. Field 3 identifies a portlet launched by Portlet A. Since portlet B was launched by portlet A, a B is installed in the record in field 3. Record 7c shows the record for portlet B, 'Diagnostic'. This portlet was launched by portlet A, which puts an A in field 1. In addition, field B designates the name of the portlet and field 3 indicates the portlet launched by portlet B. FIG. 7d launches portlets D 'Host on Demand' and E 'Host on Demand'. For this record, an additional field 4 was created to accommodate the additional portlet launched from portlet C. FIGS. 7e and 7f are both launched from portlet C. In addition, neither portlet has launched any portlets.

Figure 8:
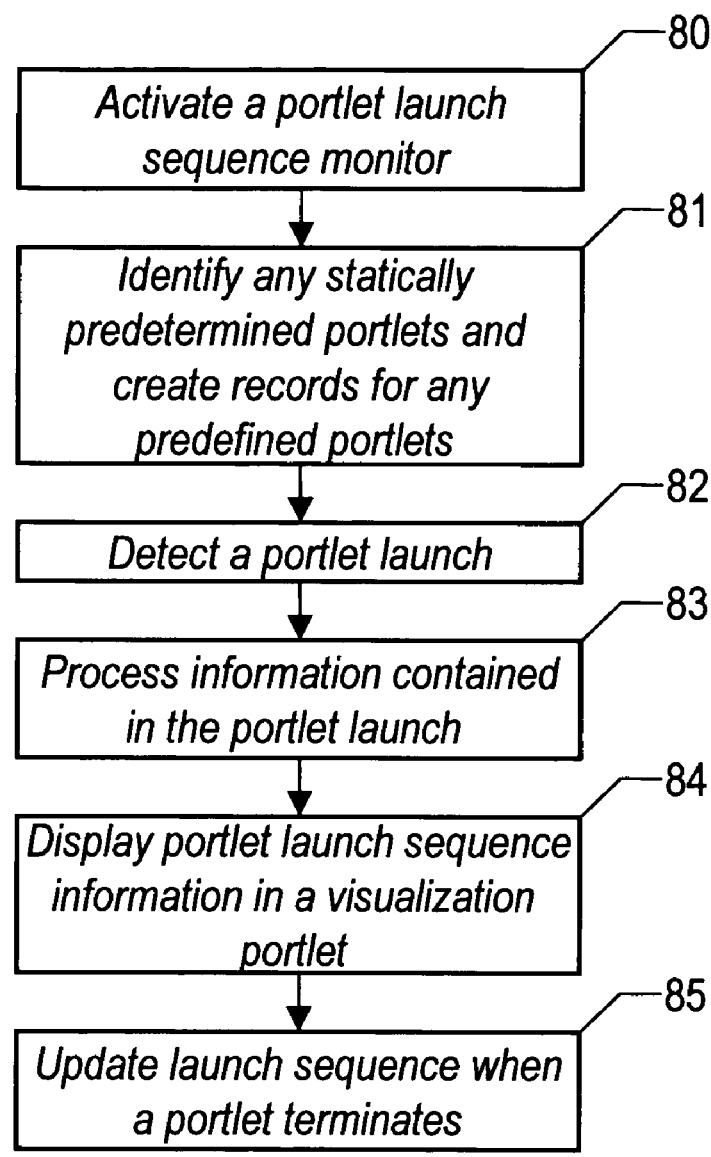
FIG. 8 is a flow diagram of the based steps in the method of the present invention.

Referring to FIG. 8 is a flow diagram of the based steps in the method of the present invention. Initially, step 80 activates the portlet launch sequence monitor. This monitor is the program that monitors portlets launching activity and intercepts the portlet launch signal each time a portlet is launched or a portlet terminates. Step 81 accesses the portlet status at the time of the activation of the portlet launch sequence monitor. This step determines and identifies any portlets that are statically defined and running at the activation of the launch sequence monitor. Step 82 detects a portlet launch. As mentioned, when a portlet is launched, the monitor detects and intercepts a signal generated by the launch. When this signal interception occurs, the monitor program gathers information about the launched portlet and the launching portlet. Step 83 processes the gathered portlet information. Step 84 displays the portlet launch information in a visualization portlet on the portal page. During the operations of the portal page, if a portlet terminates, the launch sequence monitor intercepts a generated termination signal. Step 85 identifies the terminated portlet and updates the launch sequence display to reflect the terminated portlet.

Figure 9:
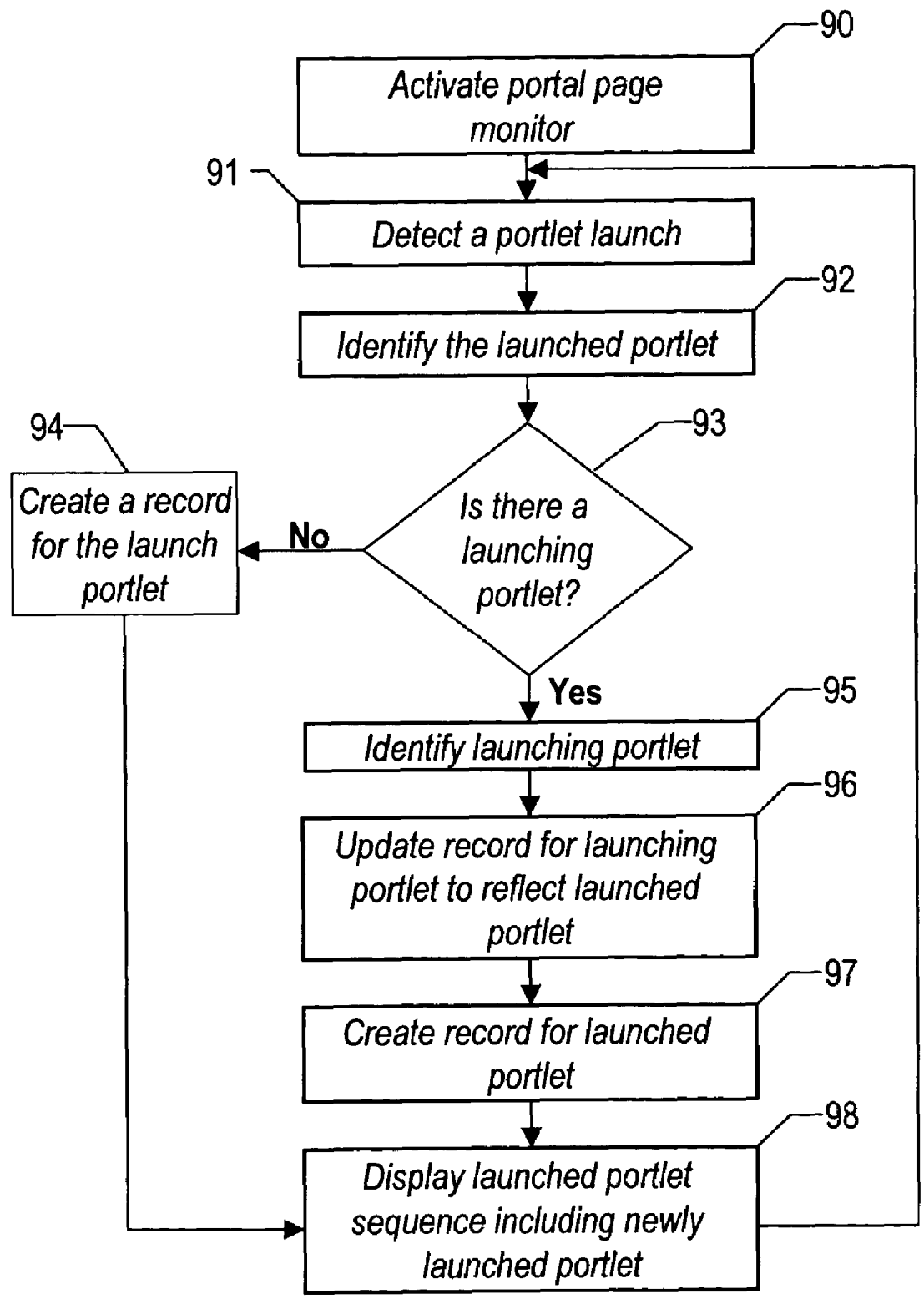
FIG. 9 is a flow diagram of a detailed implementation of the steps to create and update a visualization portlet when a new portlet is launched.

FIG. 9 shows a more detailed implementation of the steps to create and update a visualization portlet when a new portlet launch occurs. Step 90 activates the portlet launch sequence monitor for that portal page. This monitor could be a separate program or it could a system program that will monitor the portlet launch activity for any portal page in the system. As part of the activation, records could be created for any pre-existing and running portlets. Step 91 detects a portlet launch. As mentioned, this monitor will intercept the portlet launch signal each time a portlet is launched or a portlet terminates. After the detection of the portlet launch, step 92 identifies the launched portlet. After this identification, step 93 determines whether this portlet has a launching portlet. Some portlets may be present at the activation of the launch sequence monitor an will not have a launching portlet. Other portlet launches after the activation of the launch sequence monitor, may be launched by the user and therefore will also not have a launching portlet. In the event the launched portlet does not have a launching portlet, the process moves to step 94. This step creates a record for that portlet. As mentioned, the record contains fields with pointers and identifiers that define the relationship of this portlet to other existing portlets in the display. At the completion of step 94, the process moves to step 98 where the display is updated to include information from the newly launched portlet.

Referring back to step 93, if the newly launched portlet has a launching portlet, the process moves to step 95, which identifies the launching portlet. At this point, step 96 updates the existing record for the launching portlet to include the launched portlet identity. Step 97 creates a record for the newly launched portlet. This record contains an identification of the portlet and a pointer to the portlet that launched this current portlet. The records for the launched portlets can reside in any designated memory location as desired by the system designers or users. At the completion of the record creation and record update activities, step 98 retrieves the updated record information and updates the launch sequence portlet display to reflect the launch sequence changes that result from the newly launched portlet.

Figure 10:
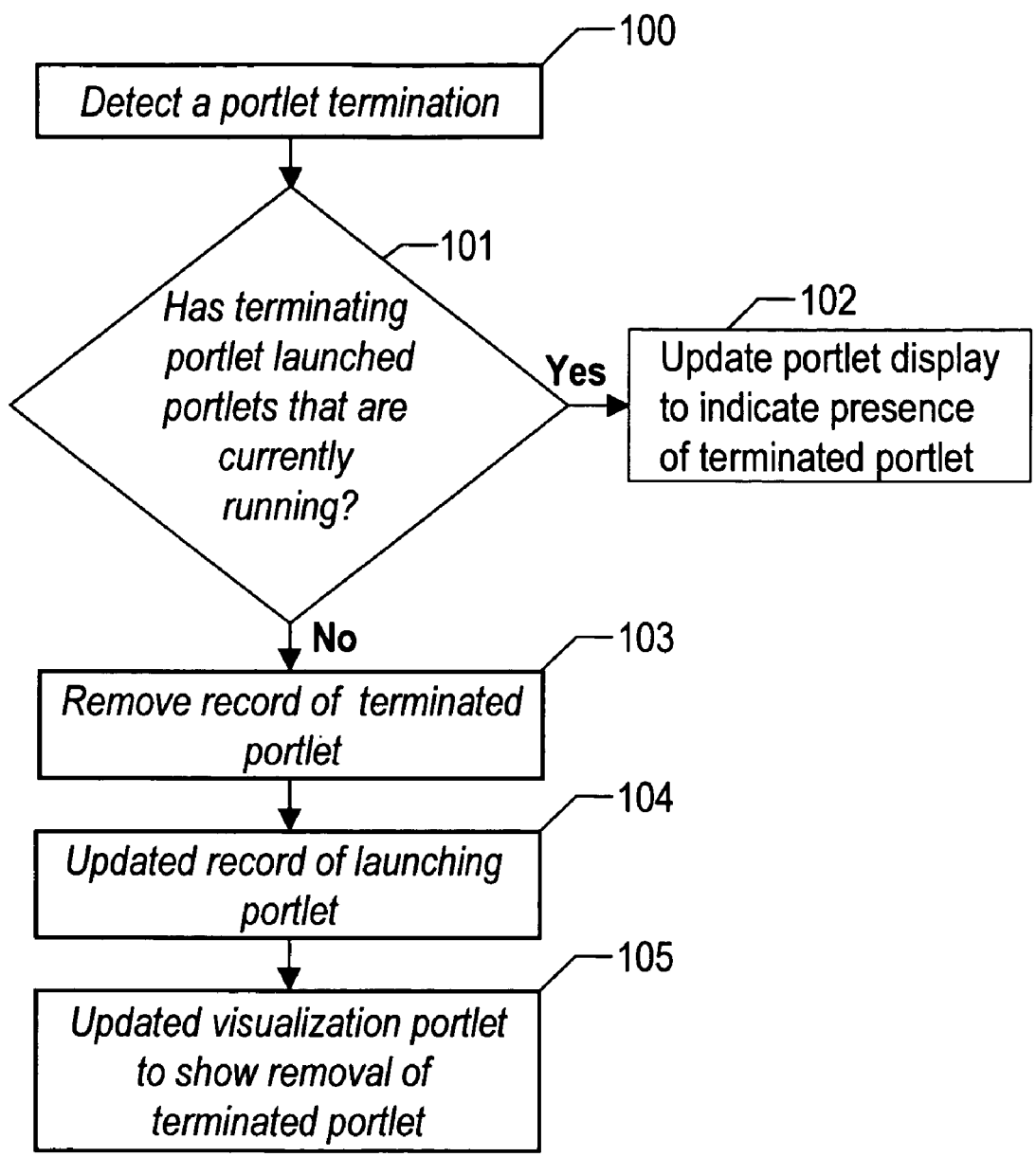
FIG. 10 is a flow diagram of the steps to update a visualization portlet display when a displayed portlet terminates.

When a running portlet terminates, it is necessary to update the launch sequence display in the same as when a portlet launch occurs. FIG. 10 illustrates the steps to update a visualization portlet display when a displayed portlet terminates. Step 100 detects the termination of a portlet in the display. After this detection it is necessary to determine if the terminating portlet has launched other portlets. Step 101 makes this determination. This determination could involve the examination of Field 3 of the terminating portlet record. If this field contains a portlet identity, then the terminating portlet has launched other portlet(s) that are currently activated. If other portlets are active, the process moves to step 102 the icon or other representation of the terminating portlet is altered but not removed from the display. The removal of a terminated portlet that has launched currently active portlet could be confusing in that no indication of the launching portlet for the active portlets would be visible. However, if the portlet that was launched by the terminated portlet terminates at that time both the currently terminating portlet and the terminated portlet that launched the currently terminating portlet would be removed from the display. Referring back to step 101, if there are no active portlets that were launched from the terminating portlet, the process moves to step 103. In this step, the record for the terminated portlet is removed from the record storage location. Step 104 updates the existing records that were related in some way to the terminating portlet. This update process would involve removing the terminating portlet reference from the appropriate fields in the portlet that initially launched the terminating portlet and any active portlets launched by the terminating portlet. After the completion of the updates, step 105 displays the portlet display after the removal of the terminated display.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media, such as digital and analog communications links.

We claim:

1. A method for displaying launch sequence information of portlets on a portal page activated in a Web-base environment, the launch sequence information being contained in a portlet and being displayed on the same portal page containing the portlets that are contained in the displayed launch sequence information, the method for displaying launch sequence information comprising the steps of:

detecting a portlet launch operation;

processing information contained in the detected portlet launch;

creating a record for a newly launched portlet, the record comprising two or more fields which can contain information about the origin of a launched portlet, the identity of the launched portlet and any other portlets launched by the portlet; and displaying a portlet launch sequence that is based on information gathered from the detected portlet launch information, the portlet launch sequence indicating the source of a launch portlet whose launch was detected and any portlet launched by the portlet whose launch was detected;

monitoring portlet activity on the portal page;

detecting the termination of an active portlet or the launch of a new portlet on the portal page;

when a portlet is terminated, removing the record and visual display of the terminated portlet;

updating portlet records related to the terminated portlet or the launched portlet;

displaying a modified portlet launch sequence; and returning to said portlet monitoring step.

2. The method as described in claim 1 further comprising before said detecting step the steps of: activating a portlet launch sequence program; and determining the current status of any portlets that are active at the time of the activation of the portlet launch sequence program.

3. The method as described in claim 1 wherein a field of a record for a newly launched portlet contains a pointer to a portlet that launched the newly launched portlet.

4. The method as described in claim 1 wherein said determination of a port let termination step further comprises:

detecting the termination of an active portlet;

determining whether any portlets launched by the terminating portlet are active;

removing the record and visual display of the terminated portlet when no portlets launched by the terminating portlet are active;

updating portlet records related to the terminated portlet; and displaying a modified portlet launch sequence.

5. The method as described in claim 1 wherein said determination of a portlet termination step further comprises:

detecting the termination of an active portlet;

determining whether any portlets launched by the terminating portlet are active;

modifying the visual display of the terminated portlet to show that launched portlets are active;

updating portlet records related to the terminated portlet; and displaying a modified portlet launch sequence.

6. The method as described in claim 1 wherein the portlet launch sequence display is a spacial display.

7. The method as described in claim 1 wherein the portlet launch sequence display is a tree presentation display.

8. The method as described in claim 1 wherein the portlet launch sequence display is a multiple page display.

9. A computer program product in a computer readable storage medium for displaying launch sequence information of portlets on a portal page activated in a Web-base environment, the launch sequence information being contained in a portlet and being displayed on the same portal page containing the portlets that are contained in the displayed launch sequence information, the method for displaying launch sequence information comprising:

instructions detecting a portlet launch operation;

instructions processing information contained in the detected portlet launch;

instructions creating a record for a newly launched portlet, the record comprising two or more fields which can contain information about the origin of a launched portlet, the identity of the launched portlet and any other portlets launched by the portlet; and instructions displaying a portlet launch sequence that is based on information gathered from the detected portlet launch information, the portlet launch sequence indicating the source of a launch portlet whose launch was detected and any portlet launched by the portlet whose launch was detected; monitoring portlet activity on the portal page;

instructions detecting the termination of an active portlet or the launch of a new portlet on the portal page;

when a portlet is terminated, instructions removing the record and visual display of the terminated portlet;

instructions updating portlet records related to the terminated portlet or the launched portlet;

instructions displaying a modified portlet launch sequence; and instructions returning to said portlet monitoring step.

10. The computer program product as described in claim 9 further comprising before said detecting instructions, instructions: activating a portlet launch sequence program; and determining the current status of any portlets that are active at the time of the activation of the portlet launch sequence program.

11. The computer program product as described in claim 9 further comprising after said displaying instructions, instructions: detecting the termination of an active portlet; removing the record and visual display of the terminated portlet; updating portlet records related to the terminated portlet; and displaying a modified portlet launch sequence.

12. The computer program product as described in claim 9 wherein said determination of a portlet termination instructions further comprise:

instructions detecting the termination of an active portlet;

instructions determining whether any portlets launched by the terminating portlet are active;

instructions modifying the visual display of the terminated portlet to show that launched portlets are active;

instructions updating portlet records related to the terminated portlet; and instructions displaying a modified portlet launch sequence.

13. A system for displaying launch sequence information or portlets activated in a Web-based environment comprising:

a user interface device having the capability to display a portal page containing portlets, and portlet launch sequence information on a display screen comprising;

a computer program for displaying launch sequence information of activated portlets on the display screen;

a display portlet incorporated into a portal web page, the incorporated portal web page displaying launch sequence information of activated portlets on the display screen;

a network interface device for establishing communication between said user interface device and a communication network;

a storage location for storing records of portlets that have launched activated portlets being displayed, a record containing fields with information on a launching portlet and all active portlets launched by the launching portlet; and a routine that detects the termination of an activated portlet on the display, determines whether that portlet has launched other portlets on the display and updates stored records related to the terminated portlet.

14. The portlet launch sequence display system as described in claim 13 further comprising a separate portlet on the display for specifically displaying launch sequence information of activated portlets.

15. The portlet launch sequence display system as described in claim 13 wherein said computer program further comprises a routine that:

monitors the portlet activities and detects when a new portlet is launched;

determines whether the detected launched program was launched by an active portlet; creates records for portlets that launch other portlets; and interprets records of launching portlets to determine which portlets were launched by other portlets for the purpose of displaying launch sequence information of activated portlets on the display screen.

* * * * *